US012749770B2

(12) United States Patent
Lee et al.

(10) Patent No.: US 12,749,770 B2
(45) Date of Patent: Sep. 29, 2026

(54) SEPARATOR FOR ELECTROCHEMICAL DEVICE AND ELECTROCHEMICAL DEVICE INCLUDING THE SAME

(71) Applicant: LG ENERGY SOLUTION, LTD., Seoul (KR)

(72) Inventors: Young-Mo Lee, Daejeon (KR); Kyung-Ryun Ka, Daejeon (KR); Ji-Su Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 19/338,750

(22) Filed: Sep. 24, 2025

(65) Prior Publication Data

US 2026/0088450 A1 Mar. 26, 2026

(30) Foreign Application Priority Data

Sep. 24, 2024 (KR) ........................ 10-2024-0129373

(51) Int. Cl.

*H01M 50/451* (2021.01)
*H01M 50/42* (2021.01)
*H01M 50/491* (2021.01)

(52) U.S. Cl.

CPC ......... *H01M 50/451* (2021.01); *H01M 50/42* (2021.01); *H01M 50/491* (2021.01)

(58) Field of Classification Search

CPC ... H01M 50/42; H01M 50/451; H01M 50/491
See application file for complete search history.

(56) References Cited

U.S. PATENT DOCUMENTS

2021/0226299 A1 7/2021 Choi et al.
2024/0079725 A1* 3/2024 Hong .................. H01M 50/423
2024/0145866 A1 5/2024 Kim et al.
2024/0313352 A1 9/2024 Cheng et al.
2025/0286228 A1* 9/2025 Misawa .............. H01M 50/417

FOREIGN PATENT DOCUMENTS

| | | | |
|---|---|---|---|
| KR | 10-2015-0042216 | A | 4/2015 |
| KR | 10-2016-0121513 | A | 10/2016 |
| KR | 10-2020-0032542 | A | 3/2020 |
| KR | 10-2084099 | B1 | 3/2020 |
| KR | 10-2020-0140637 | A | 12/2020 |
| KR | 10-2319810 | B1 | 11/2021 |
| KR | 10-2022-0151693 | A | 11/2022 |
| KR | 10-2022-0155022 | A | 11/2022 |
| KR | 10-2461667 | B1 | 11/2022 |
| KR | 10-2024-0009397 | A | 1/2024 |
| KR | 10-2024-0027097 | A | 2/2024 |
| KR | 10-2024-0046421 | A | 4/2024 |
| WO | WO 2023-210500 | * | 11/2023 |

* cited by examiner

*Primary Examiner* — Brittany L Raymond
(74) *Attorney, Agent, or Firm* — Birch, Stewart, Kolasch & Birch, LLP

(57) ABSTRACT

The present disclosure relates to a separator for an electrochemical device, which includes a coating layer having, as a binder, a copolymer including: i) a repeating unit derived from a (meth)acrylic acid monomer, a (meth)acrylate monomer, or both thereof; ii) a repeating unit derived from an acrylic monomer having an amide group; and iii) a repeating unit derived from a silane-based monomer, a monomer having a silanol group, or both thereof. In particular, the copolymer may exhibit excellent adhesion to inorganic particles by including iii) the repeating unit derived from a silane-based monomer, a monomer having the silanol group, or both thereof. Accordingly, the separator for an electrochemical device, which includes the binder, may exhibit excellent adhesion to an electrode and a low thermal shrinkage ratio.

10 Claims, No Drawings

SEPARATOR FOR ELECTROCHEMICAL DEVICE AND ELECTROCHEMICAL DEVICE INCLUDING THE SAME

TECHNICAL FIELD

The present disclosure relates to a separator for an electrochemical device and an electrochemical device including the same.

This application is based on and claims priority from Korean Patent Application No. 10-2024-0129373 filed on Sep. 24, 2024 with the Korean Intellectual Property Office, the disclosure of which is incorporated herein in its entirety by reference.

BACKGROUND

An electrochemical device converts chemical energy into electrical energy using an electrochemical reaction, and in recent years, lithium secondary batteries, which have high energy density and voltage, long cycle life, and are applicable in various fields, have been widely used.

Among the components of an electrochemical device, the separator may include a polymer substrate having a porous structure positioned between a positive electrode and a negative electrode, and the separator serves to isolate the positive electrode and the negative electrode so as to prevent an electrical short circuit between the two electrodes, while simultaneously allowing an electrolyte and ions to pass therethrough. Although the separator itself does not participate in the electrochemical reaction, physical properties such as wettability to the electrolyte, porosity, and thermal shrinkage ratio may affect the performance and safety of the electrochemical device.

Accordingly, in order to enhance the physical properties of such a separator, various methods have been attempted in which a coating layer is added to a porous polymer substrate and various materials are further included in the coating layer to improve the physical properties of the coating layer. For example, in order to improve the mechanical strength of the separator, an inorganic material may be added to the coating layer, or an inorganic material or a hydrate for improving the flame retardancy and heat resistance of the polymer substrate may be added to the coating layer.

In the coating layer, the inorganic particles may be connected to one another by a polymer binder to form an interstitial volume, and lithium ions may migrate through the interstitial volume. That is, the coating layer including a polymer binder and inorganic particles may serve to prevent thermal shrinkage of the separator while facilitating the migration of lithium ions through the separator.

Meanwhile, a poly(meth)acrylic acid binder, a polyacrylamide binder which is a polyacrylic binder having an amide group, or a copolymer binder of (meth)acrylic acid and acrylamide, used as the polymer binder, has excellent heat resistance and, when used together with the inorganic particles, may advantageously reduce the thermal shrinkage problem of the porous polymer substrate. However, the binder has low adhesion at room or high temperatures, and as the temperature increases, the adhesion of the binder becomes weaker. Accordingly, the separator for an electrochemical device including the binders in the coating layer has a problem in that the dry thermal shrinkage ratio and/or wet thermal shrinkage ratio deteriorates at high temperatures.

SUMMARY OF THE INVENTION

Problem to be Solved

An aspect of the present disclosure provides a separator for an electrochemical device, which exhibits improved dry and wet thermal shrinkage ratios at high temperatures, and an electrochemical device including the same.

Means to Solve the Problem

A separator for an electrochemical device according to a first aspect of the present disclosure includes:

a porous polymer substrate; and a coating layer disposed on at least one surface of the porous polymer substrate and including inorganic particles and a binder.

The binder includes a copolymer including i) a repeating unit derived from a (meth)acrylic acid monomer, a (meth) acrylate monomer, or both thereof, ii) a repeating unit derived from an acrylic monomer having an amide group, and iii) a repeating unit derived from a silane-based monomer, a monomer having a silanol group, or both thereof.

According to a second aspect of the present disclosure, in the first aspect, the molar ratio between i) the repeating unit derived from a (meth)acrylic acid monomer, a (meth)acrylate monomer, or both thereof and ii) the repeating unit derived from an acrylic monomer having an amide group ranges from 1:3 to 1:5.

According to a third aspect of the present disclosure, in the first or second aspect, the molar ratio between i) the repeating unit of a (meth) acrylic acid monomer, a (meth)acrylate monomer, or both thereof and iii) the repeating units derived from a silane-based monomer, a monomer having a silanol group, or both thereof ranges from 1:0.01 to 1:0.1.

According to a fourth aspect of the present disclosure, in any one of the first to third aspects, the (meth)acrylate monomer is at least one selected from the group consisting of sodium (meth)acrylate, potassium (meth)acrylate, lithium (meth)acrylate, and ammonium (meth)acrylate.

According to a fifth aspect of the present disclosure, in any one of the first to fourth aspects, the acrylic monomer having an amide group is at least one selected from the group consisting of acrylamide, methacrylamide, N,N-dimethyl(meth)acrylamide, N,N-diethyl(meth)acrylamide, N,N-dipropyl(meth) acrylamide, N,N-diisopropyl(meth)acrylamide, N,N-di (n-butyl)(meth)acrylamide, N,N-di(t-butyl)(meth)acrylamide, N-ethyl(meth)acrylamide, N-isopropyl(meth) acrylamide, N-butyl(meth)acrylamide, N-n-butyl (meth)acrylamide, N-methylol(meth)acrylamide, N-ethylol(meth)acrylamide, N-methylolpropane(meth) acrylamide, N-methoxymethyl(meth)acrylamide, N-methoxyethyl(meth)acrylamide, and N-butoxymethyl(meth)acrylamide.

According to a sixth aspect of the present disclosure, in any one of the first to fifth aspects, the silane-based monomer may be at least one selected from the group consisting of vinyltrimethoxysilane, vinylbismethoxyethoxysilane, vinyltriethoxysilane, 3-(meth)acryloxypropyltrimethoxysilane, 3-(meth) acryloxypropyltriethoxysilane, 3-(meth)acryloxypropylmethyldiethoxysilane, and vinyltriethoxysilane, and the monomer having a silanol group may be a hydrolyzed product of the silane-based monomer.

According to a seventh aspect of the present disclosure, in any one of the first to sixth aspects, the content of the binder ranges from 4 parts by weight to 20 parts by weight based on 100 parts by weight of the total weight of the coating layer.

According to an eighth aspect of the present disclosure, in any one of the first to seventh aspects, the copolymer has a weight-average molecular weight ranging from 100,000 to 200,000 g/mol.

According to a ninth aspect of the present disclosure, in any one of the first to eighth aspects, the content of the inorganic particles ranges from 80 parts by weight to 90 parts by weight based on 100 parts by weight of the total weight of the coating layer.

According to a tenth aspect of the present disclosure, in any one of the first to ninth aspects, the thickness of the coating layer ranges from 0.5 μm to 2 μm.

An eleventh aspect of the present disclosure relates to an electrochemical device.

The electrochemical device includes a positive electrode, a negative electrode, and the separator for an electrochemical device according to any one of the first to tenth aspects, and the separator for an electrochemical device is interposed between the positive electrode and the negative electrode.

Effect of the Invention

The separator for an electrochemical device according to the present disclosure includes a coating layer in which a copolymer is used as a binder together with inorganic particles. The copolymer further includes iii) a repeating unit derived from a silane-based monomer, a monomer having a silanol group, or both thereof, in addition to i) a repeating unit derived from a (meth)acrylic acid monomer, a (meth) acrylate monomer, or both thereof, and ii) a repeating unit derived from an acrylic monomer having an amide group. Accordingly, the component of iii) of the copolymer may be strongly bonded to a surface of a porous polymer substrate or a surface of the inorganic particles through intermolecular forces such as hydrogen bonding with the inorganic particles and the porous polymer substrate, and may also be bonded to a surface of an electrode. As a result, the separator for an electrochemical device according to the present disclosure, in which the copolymer binder is included in the coating layer, exhibits particularly an improved thermal shrinkage ratio at high temperatures not only in a dry state but also in a wet state.

DETAILED DESCRIPTION TO EXECUTE THE INVENTION

Hereinbelow, each configuration of the present disclosure will be described in more detail so that those ordinarily skilled in the art to which the present disclosure pertains may readily implement the present disclosure. However, the following description is merely an example, and the scope of protection of the present disclosure is not limited by the following description.

In the present disclosure, when a part is described as "including" a certain component, this means that, unless specified otherwise, the part does not exclude the presence of other components but may further include additional components.

In the present disclosure, when a component is described as being "disposed on one surface" of another component, this means that, unless specified otherwise, it does not exclude other components from being disposed therebetween, but rather that additional components may be further disposed.

In the present disclosure, the term "electrochemical device" may refer to, for example, a primary battery, a secondary battery, or a supercapacitor. More specifically, the electrochemical device may be a lithium-ion secondary battery and may be in the form of a pouch type, cylindrical type, prismatic type, or coin type, but its specific shape is not limited thereto.

In the present disclosure, the term "electrode" collectively refers to a positive electrode and a negative electrode, and may refer to a structure in which an electrode active material is applied and dried on at least one surface of a conductive material that does not cause a chemical change in the electrochemical device. The types of the conductive material and the electrode active material are not limited as long as they can be used in an electrochemical device.

In the present disclosure, the term "separator" may generally refer to a functional separator in which a porous coating layer including inorganic particles and a binder is formed on at least one surface of a porous polymer substrate such as a polyolefin-based substrate or a nonwoven fabric. In addition, the separator has a porous characteristic including a plurality of pores, and serves as a porous ion-conducting barrier that allows ions to pass through while blocking electrical contact between the positive electrode and the negative electrode in an electrochemical device.

In the present disclosure, the characteristic of being porous or having pores means that an object includes a plurality of voids or pores that are interconnected with each other, so as to allow gaseous and/or liquid fluids to pass from one surface of the object to the other surface.

In the present disclosure, the term "porous polymer substrate" may refer to a porous film having a plurality of pores and serving as a substrate that electrically insulates the positive electrode and the negative electrode to prevent a short circuit. For example, when the electrochemical device is a lithium secondary battery, the porous polymer substrate may serve as an ion-conducting barrier that allows lithium ions to pass therethrough while blocking electrical contact between the positive electrode and the negative electrode. At least a portion of the pores may form a three-dimensional network communicating between the surfaces and the interior of the porous polymer substrate, and a fluid may pass through the porous polymer substrate via the pores.

In the present disclosure, the term "particle diameter ($D_{50}$)" or "particle size ($D_{50}$)" refers to the diameter of particles corresponding to the 50% point in the cumulative volume particle size distribution of the particles to be measured. The diameter may be measured using a laser diffraction method. Specifically, after dispersing the powder to be measured in a dispersion medium, the particle size distribution may be calculated by introducing the powder into a commercially available laser diffraction particle size analyzer (e.g., Microtrac S3500) and measuring differences in diffraction patterns according to particle size when the particles pass through a laser beam. The average particle size ($D_{50}$) may be determined as the particle diameter corresponding to the 50% point of the cumulative number distribution of the particles according to the diameter in the measuring device.

In the present disclosure, the term "(meth)acrylic acid monomer" refers to a monomer that encompasses both an acrylic acid monomer and a methacrylic acid monomer. In addition, the term "(meth)acrylate monomer" refers to a monomer that encompasses both an acrylate monomer and a methacrylate monomer.

In the present disclosure, the acrylic monomer having an amide group refers to a monomer of the acryl series that has an amide group in a side chain. That is, the acrylic monomer having an amide group refers to a monomer including an acrylamide structure within the molecule. For example, the acrylamide-based monomer may be represented by a chemical formula such as $CH_2{=}CHC(O)ND_1D_2$, in which $D_1$ and $D_2$ are each independently hydrogen, nitrogen, oxygen, or a substituted or unsubstituted hydrocarbon group having 1 to 10 carbon atoms. In addition, the acrylamide-based monomer is not limited to the above chemical structure ($CH_2{=}CHC(O)ND_1D_2$) and may include additional functional groups bonded to the carbon-carbon double bond.

In the present disclosure, the term "silane-based monomer" refers to a monomer having a hydrolyzable silane group, and more specifically, a silane-based monomer in which at least one alkoxy group is bonded to a silicon atom. For example, the silane-based monomer may be represented by a chemical formula such as $CH_2{=}CHSi(OA)_3$, in which A is a hydrocarbyl group containing 1 to 8 carbon atoms. During the polymerization process, the silane-based monomer may be hydrolyzed by water or vapor so that the alkoxy group may be substituted with a silanol group. In addition, the term "monomer having a silanol group" refers to a monomer having a silanol group in a side chain.

Hereinbelow, the present disclosure will be described in more detail.

The present disclosure provides a separator for an electrochemical device.

According to an embodiment of the present disclosure, the separator for an electrochemical device includes a porous polymer substrate and a coating layer disposed on at least one surface of the porous polymer substrate. The coating layer includes inorganic particles and a binder, and the binder includes a copolymer including i) a repeating unit derived from a (meth)acrylic acid monomer, a (meth)acrylate monomer, or both thereof, ii) a repeating unit derived from an acrylic monomer having an amide group, and iii) a repeating unit derived from a silane-based monomer, a monomer having a silanol group, or both thereof. The copolymer may be formed by copolymerizing the monomers in the form of a random copolymer, a graft copolymer, or a block copolymer, and specifically, the copolymer may be a random copolymer.

A polyacrylic acid binder or a copolymer binder including i) a repeating unit derived from a (meth)acrylic acid monomer, a (meth)acrylate monomer, or both thereof, and ii) a repeating unit derived from an acrylic monomer having an amide group has an advantage in that the binder may reduce the thermal shrinkage ratio of the separator in a dry state because the binder itself undergoes little deformation at high temperatures due to its high glass transition temperature. However, the binder has poor binding strength with inorganic materials in a wet state, resulting in a problem in that it is difficult to improve the thermal shrinkage ratio in the wet state. Specifically, for example, polyacrylic acid has a hydrophilic property and a high glass transition temperature, which provides an advantage in that a swelling phenomenon caused by an electrolyte does not occur. However, since polyacrylic acid has poor binding strength inorganic particles, there is a problem in that when it is applied alone to the coating layer, it is difficult to prevent or mitigate the thermal shrinkage problem. Meanwhile, in the case of a polymer of an acrylic monomer having an amide group, such as polyacrylamide, there is an advantage in that it has high rigidity and a high glass transition temperature, and thus undergoes little deformation at high temperatures. However, since it has poor binding strength with inorganic particles, like polyacrylic acid, there is a problem in that when it is applied to the coating layer as a binder, either alone or as a copolymer with an acrylic acid monomer, it is difficult to prevent or mitigate the thermal shrinkage problem of the separator in a wet state.

The separator for an electrochemical device according to the present disclosure includes a copolymer used as a binder in a coating layer together with inorganic particles, the copolymer further including iii) a repeating unit derived from a silane-based monomer, a monomer having a silanol group, or both thereof, in addition to i) a repeating unit derived from a (meth)acrylic acid monomer, a (meth)acrylate monomer, or both thereof, and ii) a repeating unit derived from an acrylic monomer having an amide group. Accordingly, the component of iii) of the copolymer may be strongly bonded to a surface of the porous polymer substrate or a surface of the inorganic particles through intermolecular forces such as hydrogen bonding with the inorganic particles and the porous polymer substrate, and may also be bonded to an electrode surface. As a result, the separator for an electrochemical device according to the present disclosure, in which the copolymer binder is included in the coating layer, exhibits particularly an improved thermal shrinkage ratio at high temperatures not only in a dry state but also in a wet state.

Specifically, when the silane-based monomer is applied in an aqueous solvent such as water to form a coating layer, the silane-based monomer may come to include a silanol group, thereby having a silanol group like a monomer that has a silanol group. The copolymer including a silanol group may be strongly bonded to a surface of the porous polymer substrate, a surface of the inorganic particles, or a surface of the electrode through intermolecular forces such as hydrogen bonding. As a result, the separator for an electrochemical device including the copolymer binder in the coating layer according to the present disclosure exhibits a reduced thermal shrinkage ratio not only in a dry state but also in a wet state.

Also, the binder may be a solution-type binder. Since the binder is in the form of a solution type, it may adhere to the inorganic particles and the porous polymer substrate with a larger surface area within the coating layer. As a result, the thermal shrinkage ratio of the separator may be advantageously reduced more effectively than that of a particulate-type binder. At this time, the silanol group of the silane-based monomer, which acquires a silanol group by hydrolysis, or the monomer having a silanol group, may be bonded to a surface of the porous polymer substrate, a surface of the inorganic particles, or a surface of the electrode through intermolecular forces such as hydrogen bonding.

Meanwhile, unlike the silane-based monomer, a silicon acrylate monomer including silicon does not include a silane group or a silanol group. Therefore, even when the silicon acrylate monomer is copolymerized with an acrylic monomer and an acrylamide-based monomer, the resulting copolymer may not strongly interact with the surfaces of the inorganic particles and the porous polymer substrate. Accordingly, the copolymer binder including a silicon acrylate monomer, an acrylic monomer, and an acrylamide-based monomer may exhibit poor heat resistance in a wet state.

According to an embodiment of the present disclosure, the molar ratio between i) the repeating unit derived from a (meth)acrylic acid monomer, a (meth)acrylate monomer, or both thereof to ii) the repeating unit derived from an acrylic monomer having an amide group may range from 1:3 to 1:5. Specifically, the molar ratio between i) the repeating unit derived from a (meth)acrylic acid monomer, a (meth)acrylate monomer, or both thereof and ii) the repeating unit derived from an acrylic monomer having the amide group may be 1:3 or more, 1:3.5 or more, or 1:4 or more, and may also be 1:5 or less, 1:4.5 or less, or 1:4 or less. When the content of each monomer included in the copolymer satisfies the above range, both i) the repeating unit derived from a (meth)acrylic acid monomer, a (meth)acrylate monomer, or both thereof, and ii) the repeating unit derived from an acrylic monomer having an amide group, which have a high glass transition temperature and thus exhibit little shape deformation, may be sufficiently present in the copolymer, and the separator for an electrochemical device, which includes the copolymer binder in the coating layer, may exhibit a low thermal shrinkage ratio in a dry state.

According to an embodiment of the present disclosure, the molar ratio between i) the repeating unit derived from a (meth)acrylic acid monomer, a (meth)acrylate monomer, or both thereof and iii) the repeating unit derived from a silane-based monomer, a monomer having a silanol group, or both thereof may range from 1:0.01 to 1:0.1. Specifically, the molar ratio between i) the repeating unit derived from a (meth)acrylic acid monomer, a (meth)acrylate monomer, or both thereof and iii) the repeating unit derived from a silane-based monomer, a monomer having a silanol group, or both thereof may be 1:0.01 or more, 1:0.02 or more, 1:0.03 or more, 1:0.04 or more, or 1:0.05 or more, and may also be 1:0.1 or less, 1:0.09 or less, 1:0.08 or less, 1:0.07 or less, 1:0.06 or less, 1:0.05 or less, 1:0.04 or less, or 1:0.03 or less. When the content of each monomer included in the copolymer satisfies the above range, iii) the repeating unit derived from a silane-based monomer, a monomer having a silanol group, or both thereof may be sufficiently included in the copolymer, resulting in excellent interaction between the copolymer and the inorganic particles. Accordingly, the copolymer binder may exhibit excellent adhesion to the inorganic particles and the porous polymer substrate. Therefore, the separator for an electrochemical device, which includes the copolymer binder in the coating layer, may exhibit a low thermal shrinkage ratio at high temperatures and in a wet state.

In summary, the molar ratio between i) the repeating unit derived from ae (meth)acrylic acid monomer, a (meth) acrylate monomer, or both thereof, ii) the repeating unit derived from an acrylic monomer having an amide group, and iii) the repeating unit derived from a silane-based monomer, a monomer having a silanol group, or both thereof may be in the range of 1:3 to 5:0.01 to 0.1. When the content of each monomer included in the copolymer satisfies the above range, i) the repeating unit derived from a (meth) acrylic acid monomer, a (meth)acrylate monomer, or both thereof, and ii) the repeating unit derived from an acrylic monomer having an amide group, which are effective in improving adhesion in a dry state, and iii) the repeating unit derived from a silane-based monomer, a monomer having a silanol group, or both thereof, which are effective in improving adhesion in a wet state, may be present in a balanced manner, allowing for improvement in thermal shrinkage ratio in both dry and wet states to be achieved.

According to the present disclosure, among i) the repeating unit derived from a (meth)acrylic acid monomer, a (meth)acrylate monomer, or both thereof included in the copolymer, the (meth)acrylate monomer may be at least one selected from the group consisting of sodium (meth)acrylate, potassium (meth)acrylate, lithium (meth)acrylate, and ammonium (meth)acrylate.

According to an embodiment of the present disclosure, ii) the acrylic monomer having an amide group may be at least one selected from the group consisting of acrylamide, methacrylamide, N,N-dimethyl(meth)acrylamide, N,N-diethyl (meth)acrylamide, N,N-dipropyl(meth)acrylamide, N,N-diisopropyl(meth)acrylamide, N,N-di(n-butyl)(meth) acrylamide, N,N-di(t-butyl)(meth)acrylamide, N-ethyl (meth)acrylamide, N-isopropyl(meth)acrylamide, N-butyl (meth)acrylamide, N-n-butyl(meth)acrylamide, N-methylol (meth)acrylamide, N-ethylol(meth)acrylamide, N-methylolpropane(meth)acrylamide, N-methoxymethyl (meth)acrylamide, N-methoxyethyl(meth)acrylamide, and N-butoxymethyl(meth)acrylamide.

According to an embodiment of the present disclosure, the silane-based monomer may be at least one selected from the group consisting of vinyltrimethoxysilane, vinylbismethoxyethoxysilane, vinyltriethoxysilane, 3-(meth)acryloxypropyltrimethoxysilane, 3-(meth)acryloxypropyltriethoxysilane, 3-(meth)acryloxypropylmethyldiethoxysilane, and vinyltriacetoxysilane, and the monomer having a silanol group may be a hydrolyzed product of the silane-based monomer.

According to an embodiment of the present disclosure, the content of the binder may range from 4 parts by weight to 20 parts by weight based on 100 parts by weight of the total weight of the coating layer. Specifically, the content of the binder in the coating layer may be 4 parts by weight or more, 8 parts by weight or more, or 12 parts by weight or more, and may also be 20 parts by weight or less, 18 parts by weight or less, 16 parts by weight or less, 14 parts by weight or less, or 12 parts by weight or less, based on 100 parts by weight of the total weight of the coating layer. When the content of the binder in the coating layer satisfies the above range, the binder may be sufficiently present in the coating layer, and thus the separator for an electrochemical device having the coating layer disposed on one surface of the porous polymer substrate may exhibit uniformly low thermal shrinkage ratios in both dry and wet states.

According to an embodiment of the present disclosure, the copolymer may have a weight-average molecular weight ranging from 100,000 g/mol to 200,000 g/mol. Specifically, the weight-average molecular weight of the copolymer may be 100,000 g/mol or more, 110,000 g/mol or more, 120,000 g/mol or more, 130,000 g/mol or more, 140,000 g/mol or more, or 150,000 g/mol or more, and may also be 200,000 g/mol or less, 190,000 g/mol or less, 180,000 g/mol or less, 170,000 g/mol or less, 160,000 g/mol or less, 150,000 g/mol or less, or 140,000 g/mol or less. When the weight-average molecular weight of the copolymer satisfies the above range, the copolymer may have a sufficient chain length to attach to both the inorganic particles and the porous polymer substrate, thereby effectively preventing the inorganic particles from detaching from the porous polymer substrate. Accordingly, the separator for an electrochemical device, in which the coating layer including the copolymer as a binder is disposed on one surface of the porous polymer substrate, may exhibit a low thermal shrinkage ratio in both dry and wet states.

According to an embodiment of the present disclosure, the content of the inorganic particles may range from 80 parts by weight to 90 parts by weight based on 100 parts by weight of the total weight of the coating layer. Specifically, the content of the inorganic particles may be 80 parts by weight or more, 82 parts by weight or more, 84 parts by weight or more, or 86 parts by weight or more, and may also be 90 parts by weight or less, 88 parts by weight or less, or 86 parts by weight or less, based on 100 parts by weight of the total solid content of the composition for forming the coating layer. When the content of the inorganic particles satisfies the above range, the inorganic particles may be sufficiently included in the coating layer, thereby minimizing the thermal shrinkage problem of the porous polymer substrate in the separator for an electrochemical device.

According to an embodiment of the present disclosure, the inorganic particles may not undergo oxidation and/or reduction reactions within an operating voltage range of the electrochemical device (e.g., 0 V to 5 V based on $Li/Li^+$) Specifically, the inorganic particles may be at least one selected from the group consisting of $BaTiO_3$, $Pb(Zr,Ti)O_3$ (PZT), $Pb_{1-x}La_xZr_{1-y}Ti_yO_3$(PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, $TiO_2$, boehmite, aluminum peroxide, zinc tin hydroxide ($ZnSn(OH)_6$), zinc tin oxide ($Zn_2SnO_4$, $ZnSnO_3$), antimony trioxide ($Sb_2O_3$), antimony tetroxide ($Sb_2O_4$), and antimony pentoxide ($Sb_2O_5$). Among these, boehmite or alumina may be particularly selected.

According to an embodiment of the present disclosure, the inorganic particles may have a particle diameter ($D_{50}$) ranging from 200 nm to 1 μm. Specifically, the inorganic particles may have a particle diameter of 200 nm or more, 300 nm or more, 400 nm or more, or 500 nm or more, and may also have a particle diameter of 1 μm or less, 900 nm or less, 800 nm or less, 700 nm or less, 600 nm or less, or 500 nm or less. When the particle diameter of the inorganic particles satisfies the above range, a sufficient spacing may be present between the packed inorganic particles in the coating layer, resulting in high porosity of the coating layer and thus low resistance of the separator.

According to an embodiment of the present disclosure, the thickness of the coating layer may range from 0.5 μm to 2 μm. Specifically, the thickness of the coating layer may be 0.5 μm or more, 0.7 μm or more, or 0.9 μm or more, and may also be 2 μm or less, 1.8 μm or less, 1.6 μm or less, 1.4 μm or less, 1.2 μm or less, or 1 μm or less. When the thickness of the coating layer satisfies the above range, lithium ions may smoothly pass through the coating layer due to the reduced coating thickness, thereby providing an advantage of low resistance in the separator for an electrochemical device. Furthermore, since the total thickness of the separator for an electrochemical device including the coating layer may also be small, an electrode active material may be included relatively in a larger amount in the electrochemical device including the separator, thereby increasing the energy density of the electrochemical device.

According to an embodiment of the present disclosure, the porosity of the coating layer may range from 30% to 50% by volume. Specifically, the porosity of the coating layer may be 30% by volume or more, 35% by volume or more, or 40% by volume or more, and may also be 50% by volume or less, 45% by volume or less, or 40% by volume or less. When the porosity of the coating layer satisfies the above range, pores may be sufficiently present in the coating layer, so that lithium ions may smoothly migrate through the pores, resulting in low resistance of the separator for an electrochemical device. In addition, compared to a case where the porosity of the coating layer is excessively high and an excessive number of pores are present in the coating layer, the separator for an electrochemical device according to the present disclosure may exhibit excellent mechanical strength.

According to an embodiment of the present disclosure, the porous polymer substrate may be a porous film having a plurality of pores, which electrically insulates a positive electrode and a negative electrode to prevent a short circuit. For example, when the electrochemical device is a lithium secondary battery, the porous polymer substrate may serve as an ion-conducting barrier that allows lithium ions to pass therethrough while blocking electrical contact between the positive electrode and the negative electrode. At least a portion of the pores may form a three-dimensional network communicating between the surfaces and the interior of the porous polymer substrate, and a fluid may pass through the porous polymer substrate via the pores.

The porous polymer substrate may be made of a material that is physically and chemically stable with respect to an organic solvent electrolyte. For example, the porous polymer substrate may include, but is not limited to, a resin such as a polyolefin including polyethylene, polypropylene, and polybutylene, polyvinyl chloride, polyethylene terephthalate, polycycloolefin, polyethersulfone, polyamide, polyimide, polyimide-amide, nylon, polytetrafluoroethylene, or a copolymer or mixture thereof. Preferably, a polyolefin resin may be used. The polyolefin resin is processable into a relatively thin thickness and allows easy application of a composition for forming a coating layer, which makes it suitable for manufacturing an electrochemical device having higher energy density.

The porous polymer substrate may have a single-layer or multilayer structure. The porous polymer substrate may include two or more polymer resin layers having different melting points (Tm), thereby providing a shutdown function in the event of thermal runaway of the battery. For example, the porous polymer film may include a polypropylene layer having a relatively high melting point and a polyethylene layer having a relatively low melting point. Preferably, the porous polymer substrate may have a three-layer structure in which polypropylene, polyethylene, and polypropylene layers are sequentially laminated. As the temperature of the battery rises above a predetermined temperature, the polyethylene layer may melt and shut down the pores, preventing thermal runaway of the battery.

According to an embodiment of the present disclosure, the thickness of the porous polymer substrate may range from 6 μm to 15 μm. Specifically, the thickness of the porous polymer film may be 6 μm or more, 8 μm or more, or 10 μm or more, and may also be 15 μm or less, 13 μm or less, 11 μm or less, or 9 μm or less. By adjusting the thickness of the porous polymer substrate within the above range, it may be possible to minimize the volume of the electrochemical device while increasing the amount of active material contained in the electrochemical device and electrically insulating a positive electrode and a negative electrode.

According to an embodiment of the present disclosure, the porous polymer substrate may include pores having an average diameter ($D_{50}$) ranging from 0.01 μm to 1 μm. Specifically, the average diameter of the pores included in the porous polymer substrate may be 0.01 μm or more, 0.02 μm or more, 0.03 μm or more, or 0.04 μm or more, and may also be 1 μm or less, 0.09 μm or less, 0.08 μm or less, 0.07 μm or less, or 0.06 μm or less. Preferably, the pore size may range from 0.02 μm to 0.06 μm. By adjusting the pore size of the porous polymer substrate within the above range, the air permeability and ionic conductivity of the entire separator may be controlled.

The porous polymer substrate may have an air permeability ranging from about 10 s/100 cc to 100 s/100 cc. Specifically, the air permeability of the porous polymer substrate may be 10 s/100 cc or more, 20 s/100 cc or more, 30 s/100 cc or more, 40 s/100 cc or more, or 50 s/100 cc or more, and may also be 100 s/100 cc or less, 90 s/100 cc or less, 80 s/100 cc or less, 70 s/100 cc or less, 60 s/100 cc or less, or 50 s/100 cc or less. Preferably, the air permeability of the porous polymer substrate may range from 50 s/100 cc to 70 s/100 cc. When the air permeability of the porous polymer substrate is within the above range, the air permeability of the resulting separator may be provided within an appropriate range for ensuring output and cycle characteristics of the electrochemical device.

The air permeability (s/100 cc) refers to the time (seconds) required for 100 cc of air to pass through a predetermined area of the porous polymer substrate or separator under a constant pressure. The air permeability may be measured using a permeability tester (Gurley densometer) according to ASTM D 726-58, ASTM D 726-94, or JIS-P8117. For example, the time required for 100 cc of air to pass through a sample having an area of 1 square inch (or 6.54 $cm^2$) under an air pressure of 0.304 kPa or a water pressure of 1.215 $kN/m^2$ may be measured using a 4110N instrument of Gurley. For example, the time required for 100 cc of air to pass through a sample having an area of 1 square inch under a constant water pressure of 4.8 inches at room temperature may be measured using an EG01-55-1MR instrument of Asahi Seiko.

According to an embodiment of the present disclosure, the porous polymer substrate may have a porosity ranging from 10% to 70% by volume. Specifically, the porosity of the porous polymer substrate may be 10% by volume or more, 20% by volume or more, 30% by volume or more, or 40% by volume or more, and may also be 70% by volume or less, 60% by volume or less, or 50% by volume or less. Preferably, the porosity of the porous polymer substrate may range from 40% to 60% by volume. When the porosity of the porous polymer substrate is within the above range, the ion conductivity of the resulting separator may be provided within an appropriate range for ensuring the output and cycle characteristics of the electrochemical device.

The porosity described above refers to the volume ratio of pores to the total volume in each of the coating layer and the porous polymer substrate. The porosity may be measured by a method known in the art. For example, the porosity may be measured by the Brunauer-Emmett-Teller (BET) method using nitrogen gas adsorption, a capillary flow porometer method, or a water or mercury intrusion method.

The present disclosure provides an electrochemical device.

The electrochemical device may include the separator for an electrochemical device described above.

According to an embodiment of the present disclosure, the electrochemical device may include a positive electrode, a negative electrode, and the separator for an electrochemical device, and the separator for an electrochemical device may be interposed between the positive electrode and the negative electrode. In the electrochemical device according to an embodiment of the present disclosure, the overlapping description of the separator for an electrochemical device will be omitted.

The electrochemical device is a device that converts chemical energy into electrical energy through an electrochemical reaction and encompasses both primary and secondary batteries. The secondary battery refers to a rechargeable battery, such as a lithium secondary battery, a nickel-cadmium battery, or a nickel-hydrogen battery. The lithium secondary battery uses lithium ions as ionic conductors and may include, for example, a non-aqueous electrolyte secondary battery including a liquid electrolyte, an all-solid-state battery including a solid electrolyte, a lithium polymer battery including a gel polymer electrolyte, or a lithium metal battery using lithium metal as a negative electrode, but is not limited thereto.

Since the electrochemical device includes the separator for an electrochemical device described above, excellent adhesion may be achieved between the separator for an electrochemical device and the electrode. Accordingly, even when the electrochemical device is driven for a long period of time, safety degradation caused by detachment of the separator may be minimized.

According to an embodiment of the present disclosure, the positive electrode may include a positive electrode current collector and a positive electrode active material layer including a positive electrode active material, a conductive material, and a binder resin on at least one surface of the current collector. The positive electrode active material may include one or a mixture of two or more selected from: layered compounds such as lithium manganese complex oxide (e.g., $LiMn_2O_4$ or $LiMnO_2$), lithium cobalt oxide ($LiCoO_2$), and lithium nickel oxide ($LiNiO_2$), or a compound substituted with one or more transition metals; lithium manganese oxides such as those expressed by the formula $Li_{1+x}Mn_{2-x}O_4$ (where x is 0 to 0.33), $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni site type lithium nickel oxide expressed by the chemical formula $LiNi_{1-x}M_xO_2$ (where M=Co, Mn, Al, Cu, Fe, Mg, B or Ga, and x=0.01 to 0.3); lithium manganese complex oxides expressed by the chemical formula $LiMn_{1-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ in which part of Li in the chemical formula is replaced with an alkaline earth metal ion; disulfide compounds; and $Fe_2(MoO_4)_3$.

According to an embodiment of the present disclosure, the negative electrode may include a negative electrode current collector and a negative electrode active material layer including a negative electrode active material, a conductive material, and a binder resin on at least one surface of the current collector. The negative electrode may include, as the negative electrode active material, one or a mixture of two or more selected from: lithium metal oxides; carbon such as non-graphitizable carbon or graphitic carbon; metal composite oxides such as $LixFe_2O_3$ ($0 \le x \le 1$), $Li_xWO_2$ ($0 \le x \le 1$), or $Sn_xMe_{1-x}Me'_yO_z$ (where Me is Mn, Fe, Pb, or Ge; Me' is Al, B, P, Si, elements belonging to Group 1, 2, or 3 of the periodic table, or halogen; $0 < x \le 1$; $1 \le y \le 3$; $1 \le z \le 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and titanium oxides.

According to an embodiment of the present disclosure, the conductive material may be, for example, one or a mixture of two or more selected from the group consisting of graphite, carbon black, carbon fibers or metal fibers, metal powder, conductive whiskers, conductive metal oxides, activated carbon, and polyphenylene derivatives. More specifically, the conductive material may be, for example, one or a mixture of two or more selected from the group consisting of natural graphite, artificial graphite, super-p, acetylene black, Ketjen black, channel black, furnace black, lamp black, thermal black, denka black, aluminum powder, nickel powder, zinc oxide, potassium titanate, and titanium oxide.

According to an embodiment of the present disclosure, the current collector is not particularly limited as long as it has high conductivity and does not cause chemical changes in the battery. For example, stainless steel, copper, aluminum, nickel, titanium, baked carbon, or a surface-treated material obtained by treating the surface of aluminum or stainless steel with, for example, carbon, nickel, titanium, or silver may be used.

According to an embodiment of the present disclosure, the binder resin may be a polymer commonly used for electrodes in the art. Non-limiting examples of such a binder resin may include, for example, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, and carboxyl methyl cellulose, but are not limited thereto.

According to an embodiment of the present disclosure, the positive electrode slurry for preparing a positive electrode active material layer may include a dispersant, and the dispersant may be a pyrrolidone-based compound. Specifically, the dispersant may be N-methylpyrrolidone (ADC-01, LG Chem).

According to an embodiment of the present disclosure, the electrochemical device may further include an electrolyte salt, in which the electrolyte salt has a structure of $A^+B^-$, where $A^+$ may include an alkali metal cation such as $Li^+$, $Na^+$, or $K^+$, or an ion consisting of a combination thereof. In addition, $B^-$ may be obtained by dissolving or dissociating a salt including an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, or $C(CF_2SO_2)_3^-$, or an ion consisting of a combination thereof, in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof, but is not limited thereto.

An embodiment of the present disclosure may provide a battery module including the electrochemical device as a unit cell, a battery pack including the battery module, and a device including the battery pack as a power source. Specific examples of the device include, but are not limited to, a power tool that is powered by a battery powered motor, an electric car such as an electric vehicle (EV), a hybrid electric vehicle (HEV), or a plug-in hybrid electric vehicle (PHEV), an electric motorcycle such as an electric bike (E-bike) or an electric scooter (E-scooter), an electric golf cart, and a power storage system.

According to an embodiment of the present disclosure, the electrochemical device may constitute a cylindrical secondary battery, in which the separator for an electrochemical device is interposed between the positive electrode and the negative electrode. In this case, the separator, the positive electrode, and the negative electrode may be stacked in the form of an electrode assembly having a separator/positive electrode/separator/negative electrode structure or a positive electrode/separator/negative electrode/separator structure, and then wound. The positions of the positive electrode and the negative electrode may be changed with each other. The electrode assembly stacked as described above may be bound to a winding core, inserted into a cylindrical can, and crimped to manufacture a cylindrical secondary battery.

Hereinbelow, in order to specifically describe the present disclosure, embodiments will be given and described in detail. However, the embodiments according to the present disclosure may be modified into various other forms, and the scope of the present disclosure should not be construed as being limited to the embodiments to be described below. The embodiments described herein are provided to more completely explain the present disclosure to a person ordinarily skilled in the art.

EXAMPLES AND COMPARATIVE EXAMPLES

Preparation of Binder

Copolymer binders were prepared by varying the types and contents of monomers as indicated in Table 1 below.

Preparation Example 1

A copolymer binder including acrylic acid (AA), acrylamide (AM), and vinyltrimethoxysilane (SM) monomers at a molar ratio of 1:4:0.05 was prepared.

Preparation Example 2

A copolymer binder was prepared in the same manner as in Preparation Example 1, except that 3-acryloxypropyltrimethoxysilane (SM) was used instead of the vinyltrimethoxysilane in Preparation Example 1.

Preparation Example 3

A copolymer binder was prepared in the same manner as in Preparation Example 1, except that the copolymer was prepared so that the molar ratio of the monomers in the copolymer satisfied 1:4:0.025.

Preparation Example 4

A copolymer binder was prepared in the same manner as in Preparation Example 1, except that the copolymer was prepared so that the molar ratio of the monomers in the copolymer satisfied 1:4:0.25.

Comparative Preparation Example 1

A copolymer binder was prepared in the same manner as in Preparation Example 1, except that no vinyltrimethoxysilane was used in Preparation Example 1.

Comparative Preparation Example 2

A copolymer binder was prepared in the same manner as in Preparation Example 1, except that no vinyltrimethoxysilane was used in Preparation Example 1 and the copolymer was prepared so that the molar ratio of the acrylic acid and acrylamide monomers satisfied 1:0.7.

Comparative Preparation Example 3

A copolymer binder was prepared in the same manner as in Preparation Example 1, except that no vinyltrimethoxysilane was used in Preparation Example 1 and the copolymer was prepared so that the molar ratio of the acrylic acid and acrylamide monomers satisfied 1:0.25.

Comparative Preparation Example 4

A copolymer binder was prepared in the same manner as in Preparation Example 1, except that poly(dimethylsiloxane), monomethacrylate terminated (silicone acrylate (SA)) was used instead of vinyltrimethoxysilane in Preparation Example 1.

TABLE 1

| Classification | | Monomer Content (Molar Ratio) AA | AM | SM | SA | Weight-Average Molecular Weight (g/mol) |
|---|---|---|---|---|---|---|
| Copolymer Binder | Preparation Example 1 | 1 | 4 | 0.05 | — | 130,000 |
| | Preparation Example 2 | 1 | 4 | 0.05 | — | 140,000 |
| | Preparation Example 3 | 1 | 4 | 0.025 | — | 130,500 |
| | Preparation Example 4 | 1 | 4 | 0.25 | — | 150,000 |
| | Comparative Preparation Example 1 | 1 | 4 | — | — | 130,000 |
| | Comparative Preparation Example 2 | 1 | 0.7 | — | — | 140,000 |
| | Comparative Preparation Example 3 | 1 | 0.25 | — | — | 130,000 |
| | Comparative Preparation Example 4 | 1 | 4 | — | 0.05 | 130,500 |

The weight-average molecular weight in Table 1 was measured using GPC.

Preparation of Separator for Electrochemical Device

Example 1

A polyethylene film (thickness: 10 μm, air permeability: 54 s/100 cc) was prepared as a porous polymer substrate.

Boehmite powder (particle diameter ($D_{50}$): 500 nm) was prepared as inorganic particles. The binder of Preparation Example 1 was prepared as a binder. Sodium carboxymethyl cellulose (CMC-Na) (SG-L02, GL Chem Co., Ltd.) was prepared as a thickener, and a maleic acid-based dispersant was prepared as a dispersant. The prepared inorganic particles, binder, thickener, and dispersant were added to water in a weight ratio of 86:12:1:1, and then the inorganic particles were pulverized and dispersed to preparate a composition for forming a coating layer.

The composition for forming a coating layer was applied to one surface of the porous polymer substrate by a bar-coating method using a doctor blade and dried with 50° C. air from a heat gun to form a coating layer on the one surface of the porous polymer substrate, thereby manufacturing a separator for an electrochemical device.

At this time, based on the total 100 parts by weight of the coating layer, the content of the binder was 12 parts by weight and the content of the inorganic particles was 86 parts by weight. The porosity of the coating layer was 40 vol %, and the thickness of the coating layer was 1.5 μm.

Examples 2 to 4 and Comparative Examples 1 to 4

In Example 1, the separators for an electrochemical device of Examples 2 to 4 and Comparative Examples 1 to 4 were manufactured by using the binders of Preparation Examples 2 to 4 and Comparative Preparation Examples 1 to 4 instead of the binder of Preparation Example 1.

The physical properties of the separators for an electrochemical device of the Examples and Comparative Examples are indicated in Tables 2 and 3 below.

Experimental Example (1) Verification of Dry Shrinkage Ratio of Separator

Samples of the separators for an electrochemical device of the Examples and Comparative Examples were prepared in a size of 5 cm×5 cm. After being stored in a convection oven at 180° C. for 30 minutes, the separators were taken out, and the thermal shrinkage ratios in the machine direction (MD) and transverse direction (TD) were respectively calculated according to the following equation: thermal shrinkage ratio=[(initial length−length after storage at 180° C. for 0.5 h)/initial length]×100(%).

(2) Verification of Wet Shrinkage Ratio of Separator

Samples of the separators for an electrochemical device of the Examples and Comparative Examples were prepared in a size of 5 cm×5 cm and individually inserted into aluminum pouches having a size of 7 cm×10 cm. One gram of the electrolyte described below was injected into each pouch, and the pouch was sealed.

As the electrolyte, a solvent mixed with ethylene carbonate (EC) and ethyl methyl carbonate (EMC) at a weight ratio of 3:7 was used, the solvent containing 2 wt % of vinylene carbonate (VC) as an additive and 1 M of lithium salt $LiPF_6$. The sealed pouches were stored in a convection oven at 140° C. for 30 minutes, and the separators were then taken out. For each separator, the thermal shrinkage ratios in the MD and TD were calculated according to the following equation: thermal shrinkage ratio=[(initial length−length after storage at 140° C. for 0.5 h)/initial length]×100(%). The experimental results are indicated in Tables 2 and 3 below.

TABLE 2

| Classification | | Example 1 | Example 2 | Example 3 | Example 4 |
|---|---|---|---|---|---|
| Porous Polymer Substrate | Air Permeability (s/100 cc) | 54 | 54 | 54 | 54 |
| | Thickness (μm) | 10 | 10 | 10 | 10 |
| Coating Layer | Binder Content (wt %) | 12 | 12 | 12 | 12 |
| | Inorganic Particle Content (wt %) | 86 | 86 | 86 | 86 |
| | Single Side/ Double Side | Double Side | Double Side | Double Side | Double Side |

TABLE 2-continued

| Classification | Example 1 | Example 2 | Example 3 | Example 4 |
|---|---|---|---|---|
| Porosity (vol %) | 40 | 38 | 37 | 36 |
| Thickness (μm) | 1.5 | 1.5 | 1.5 | 1.5 |
| Separator Thickness (μm) | 13.1 | 13.0 | 13.0 | 13.1 |
| Dry Thermal Shrinkage Ratio @180° C./0.5 h (MD(%)/TD(%)) | 2/1 | 3/2 | 3/1 | 6/4 |
| Wet Thermal Shrinkage Ratio @140° C./0.5 h (MD(%)/TD(%)) | 3/2 | 7/4 | 6/5 | 9/9 |

TABLE 3

| Classification | | Comparative Example 1 | Comparative Example 2 | Comparative Example 3 | Comparative Example 4 |
|---|---|---|---|---|---|
| Porous Polymer Substrate | Air Permeability (s/100 cc) | 54 | 54 | 54 | 54 |
| | Thickness (μm) | 10 | 10 | 10 | 10 |
| Coating Layer | Binder Content (wt %) | 12 | 12 | 12 | 12 |
| | Inorganic Particle Content (wt %) | 86 | 86 | 86 | 86 |
| | Single Side/ Double Side | Double Side | Double Side | Double Side | Double Side |
| | Porosity (vol %) | 40 | 34 | 35 | 34 |
| | Thickness (μm) | 1.5 | 1.5 | 1.5 | 1.5 |
| Separator Thickness (μm) | | 13.0 | 13.1 | 13.0 | 12.9 |
| Dry Thermal Shrinkage Ratio @180° C./0.5 h (MD(%)/TD(%)) | | 4/3 | 6/5 | 8/6 | 7/6 |
| Wet Thermal Shrinkage Ratio @140° C./0.5 h (MD(%)/TD(%)) | | 10/8 | 14/9 | 16/11 | 25/17 |

As indicated in Tables 2 and 3, the separators for an electrochemical device of Comparative Examples 1 to 3, each of which included a copolymer binder of an acrylic monomer and an acrylamide monomer, exhibited poor adhesion between the coating layer and the porous polymer substrate. As a result, it was verified that the thermal shrinkage ratios in the wet state were significantly high. In contrast, the separator for an electrochemical device according to each Example included a coating layer having a copolymer binder of an acrylic monomer, an acrylamide monomer, and a silane-based monomer and disposed on both surfaces of the porous polymer substrate. As a result, it was verified that the thermal shrinkage ratios in both the dry and wet states were uniformly low. In particular, in Examples 1 to 3, where the molar ratio between the acrylic monomer and the silane-based monomer satisfied a range from 1:0.01 to 1:0.1, it was verified that the separators exhibited even lower thermal shrinkage ratios.

In addition, the separator for an electrochemical device of Comparative Example 4, which included a copolymer binder of an acrylic monomer, an acrylamide monomer, and a silicone acrylate monomer in the coating layer, exhibited reduced adhesion between the coating layer and the porous polymer substrate due to the presence of the silicone acrylate monomer in the copolymer. As a result, it was verified that the thermal shrinkage ratio in the wet state was significantly higher compared to Comparative Examples 1 to 3.

In view of the above, it was verified that the separator for an electrochemical device according to the present disclosure achieves the effect of improving both the thermal shrinkage ratio in the dry state and the thermal shrinkage ratio in the wet state due to the above-described copolymer binder.

What is claimed is:

1. A separator for an electrochemical device comprising:

a porous polymer substrate; and a coating layer disposed on at least one surface of the porous polymer substrate and including inorganic particles and a binder, wherein the binder includes a copolymer including i) a repeating unit derived from a (meth)acrylic acid monomer, a (meth)acrylate monomer, or both thereof, ii) a repeating unit derived from an acrylic monomer having an amide group, and iii) a repeating unit derived from a silane-based monomer, a monomer having a silanol group, or both thereof, and wherein the molar ratio between i) the repeating unit of a (meth)acrylic acid monomer, a (meth)acrylate monomer, or both thereof and iii) the repeating units derived from a silane-based monomer, a monomer having a silanol group, or both thereof ranges from 1:0.01 to 1:0.1.

2. The separator for the electrochemical device according to claim 1, wherein the molar ratio between i) the repeating unit derived from a (meth)acrylic acid monomer, a (meth) acrylate monomer, or both thereof and ii) the repeating unit derived from an acrylic monomer having an amide group ranges from 1:3 to 1:5.

3. The separator for the electrochemical device according to claim 1, wherein the (meth)acrylate monomer is at least one selected from the group consisting of sodium (meth) acrylate, potassium (meth)acrylate, lithium (meth)acrylate, and ammonium (meth)acrylate.

4. The separator for the electrochemical device according to claim 1, wherein the acrylic monomer having an amide group is at least one selected from the group consisting of acrylamide, methacrylamide, N,N-dimethyl(meth)acrylamide, N,N-diethyl(meth)acrylamide, N,N-dipropyl(meth) acrylamide, N,N-diisopropyl(meth)acrylamide, N,N-di(n-butyl)(meth)acrylamide, N,N-di(t-butyl)(meth)acrylamide, N-ethyl(meth)acrylamide, N-isopropyl(meth)acrylamide, N-butyl(meth)acrylamide, N-n-butyl(meth)acrylamide, N-methylol(meth)acrylamide, N-ethylol(meth)acrylamide, N-methylolpropane(meth)acrylamide, N-methoxymethyl (meth)acrylamide, N-methoxyethyl(meth)acrylamide, and N-butoxymethyl(meth)acrylamide.

5. The separator for the electrochemical device according to claim 1, wherein the silane-based monomer is at least one selected from the group consisting of vinyltrimethoxysilane, vinylbismethoxyethoxysilane, vinyltriethoxysilane, 3-(meth)acryloxypropyltrimethoxysilane, 3-(meth)acryloxypropyltriethoxysilane, 3-(meth)acryloxypropylmethyldiethoxysilane, and vinyltriethoxysilane, and the monomer having a silanol group may be a hydrolyzed product of at least one selected from the group consisting of vinyltrimethoxysilane, vinylbismethoxyethoxysilane, vinyltriethoxysilane, 3-(meth)acryloxypropyltrimethoxysilane, 3-(meth) acryloxypropyltriethoxysilane, 3-(meth) acryloxypropylmethyldiethoxysilane, and vinyltriethoxysilane.

6. The separator for the electrochemical device according to claim 1, wherein the content of the binder ranges from 4 parts by weight to 20 parts by weight based on 100 parts by weight of the total weight of the coating layer.

7. The separator for the electrochemical device according to claim 1, wherein the copolymer has a weight-average molecular weight ranging from 100,000 to 200,000 g/mol.

8. The separator for the electrochemical device according to claim 1, wherein the content of the inorganic particles ranges from 80 parts by weight to 90 parts by weight based on 100 parts by weight of the total weight of the coating layer.

9. The separator for the electrochemical device according to claim 1, wherein the thickness of the coating layer ranges from 0.5 μm to 2 μm.

10. An electrochemical device comprising:

a positive electrode; a negative electrode; and the separator for an electrochemical device according to claim 1, wherein the separator for an electrochemical device is interposed between the positive electrode and the negative electrode.

* * * * *